United States Patent
Maekawa et al.

(10) Patent No.: US 6,399,201 B1
(45) Date of Patent: *Jun. 4, 2002

(54) BLOWING AGENT POWDER AND PROCESS FOR PRODUCING THE SAME

(75) Inventors: Tsukasa Maekawa; Toshinori Takao; Sadafumi Shono; Chiaki Yasumaru; Shigeru Sumitomo; Nobuyuki Ueda; Yoshifumi Tachi, all of Tokushima (JP)

(73) Assignee: Otsuka Chemical Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/113,511

(22) Filed: Jul. 10, 1998

(30) Foreign Application Priority Data

Mar. 19, 1998 (JP) .......................................... 10-069618
Apr. 17, 1998 (JP) .......................................... 10-107262

(51) Int. Cl.⁷ ................................................. B32B 5/16
(52) U.S. Cl. ........................ 428/403; 252/355; 427/212; 427/241; 428/407
(58) Field of Search ................................. 428/403, 407; 252/355; 427/212, 241

(56) References Cited

U.S. PATENT DOCUMENTS

| | | | | |
|---|---|---|---|---|
| 3,903,015 A | * | 9/1975 | Roos et al. | 252/350 |
| 4,263,165 A | * | 4/1981 | Roos et al. | 252/350 |
| 4,444,679 A | | 4/1984 | Rowland et al. | |
| 4,714,568 A | * | 12/1987 | Hurnik et al. | 521/89 |
| 5,051,206 A | * | 9/1991 | Bathgate | 252/350 |
| 5,187,206 A | * | 2/1993 | Volkert et al. | 521/129 |
| 5,206,275 A | * | 4/1993 | Kubo et al. | 524/114 |
| 5,821,274 A | * | 10/1998 | Martin | 521/89 |
| 5,979,787 A | | 11/1999 | Scarpa | 239/9 |

FOREIGN PATENT DOCUMENTS

| | | |
|---|---|---|
| AU | B-14214/83 | 11/1985 |
| AU | B-18098/83 | 8/1987 |
| AU | B-38660/85 | 12/1988 |
| AU | B-10354/88 | 7/1991 |
| JP | 48-26233 | 8/1973 |
| JP | 56-95936 | 8/1981 |
| JP | 56-147833 | 11/1981 |
| JP | 8-295872 | 11/1996 |
| KR | 1991-0004050 | 6/1991 |

OTHER PUBLICATIONS

Soda, Y., "Ice–Cream Produce Using a Coated Foaming Agent," Abstract No. XP–002104667.

Yakuhin, O. K., "Blow Agent Composition Comprising AZO DI Carbonamide and Inorganic Zinc Compound Incorporating Fatty Acid to Increase Rate Decompose," Nov. 17, 1981, Abstract No. XP–002104668.

"Prepparation of Fine Grain AZO Di Carboxamide by adding its Saturated Di Methly Sulphoxide Solution to Aromatic Hydrocarbon, using as Foaming Agent for Polyolefin," Sumitomo Electronic Ind. Co., Jan. 25, 1989, Abstract No. XP–002104669.

Yakuhin, O. K., "Modified Chemical Foaming Agent—is Chemical Foaming Agent Whose Surface is Coated with Aluminum Compound Coupling Agent," Nov. 12, 1996; Abstract No. XP–002104670.

"Azodicarbonamide Granular Blowing Agents Containing Suspension–Polymds. PVC, di–Bu–phthalate Calcium Stearate," Jul. 14, 1975, Abstract No. XP–002104671.

Canadian Office Action, dated May 1, 2001.

* cited by examiner

Primary Examiner—Hoa T. Le
(74) Attorney, Agent, or Firm—Whitham, Curtis & Christofferson, PC

(57) ABSTRACT

A powder comprising a blowing agent powder core which is coated with at least one oil-like substance on its surface, and a process for producing a powder comprising a blowing agent powder core which is coated with at least one oil-like substance on its surface, comprising the following steps (a) and (b): (a) adding at least one oil-like substance in the form of a mist to a blowing agent powder; and (b) mixing the oil-like substance with the blowing agent powder under such mixing conditions that the blowing agent powder is less susceptible to pulverization.

20 Claims, No Drawings

BLOWING AGENT POWDER AND PROCESS FOR PRODUCING THE SAME

BACKGROUND OF THE INVENTION

1. Filed of the Invention

The present relates to a blowing agent powder and a process for producing the same.

2. Discussion of the Background

Blowing agents have conventionally been used in the form of a fine powder, and have posed a problem of dusting in the working atmosphere.

As a means for eliminating the above problem, a technique has been proposed in which a blowing agent powder is mixed with a wax under heating using a mixer having shearing blades, mixing blades, or the like, and the resultant mixture is granulated (see Japanese Published Unexamined Patent Application No. 90543/77). However, the granulated blowing agent obtained by the above technique has poor homogeneity and poor dispersibility into resins. It is therefore difficult to use the granulated blowing agent to obtain a finely and evenly foamed object, and therefore, the granulated blowing agent is hence unsatisfactory for practical use.

Furthermore, such conventional blowing agents have a problem that they agglomerate and are solidified with the lapse of time or under load to thereby show impaired flowability in the step of addition to resins to cause hopper clogging, or to thereby have impaired dispersibility into resins. Mitigation of this solidification is desired more and more with the recent trend toward quality improvement in foamed resins and labor saving in the production thereof.

On the other hand, techniques which have been employed for inhibiting the solidification of blowing agents include (1) technique of adding inorganic powder particles, e.g., silica, metal silicate or the like, as a solidification inhibitor to a blowing agent, (2) technique of batchwise drying a blowing agent for a sufficient period to thereby diminish the water contained therein in a slight amount, and the like.

However, use of these techniques has various drawbacks. Namely, technique (1), although effective in solidification prevention in some degree, cannot impart the effect which lasts beyond several months. For application to a blowing agent comprising finer particles, inorganic powder particles should be added in a larger amount. However, the addition of a larger amount of the inorganic powder particles is causative of cell enlargement during foaming, and is hence undesirable in applications where fine cells are required. Technique (2), on the other hand, has significantly reduced productivity because the drying requires much time, resulting in an increased production cost. In addition, technique (2) cannot cope with continuous production.

Japanese Published Unexamined Patent Application No. 320432/92 discloses a method of adding a silane coupling agent dissolved in a solvent to azodicarbonamide to thereby improve flow ability and dispersibility into resins. Furthermore, Japanese Published Unexamined Patent Application No. 295872/96 discloses a method of adding an aluminum coupling agent dissolved in a solvent to a chemically blowing agent to thereby improve flowability and dispersibility into resins. However, these techniques each is in sufficient in the effect of solidification prevention and ineffective in eliminating the problem of dusting.

SUMMARY OF THE INVENTION

An object of the present invention is to provide a modified blowing agent powder which is inhibited from causing dusting in the working atmosphere during each of packaging, transportation, storage, use, and the like, and is inhibited from aggregation and solidification with the lapse of time or under load, is homogeneous, and has satisfactory dispersibility into resins.

Another object of the present invention is to provide a process for producing the blowing agent powder.

These and other objects of the present invention have been attained by a powder comprising a blowing agent powder core which is coated with at least one oil-like substance on its surface.

Furthermore, these and other objects of the present invention have been attained by a process for producing a powder comprising a blowing agent powder core which is coated with at least one oil-like substance on its surface, comprising the following steps (a) and (b):

(a) adding at least one oil-like substance in the form of a mist to a blowing agent powder; and (b) mixing the oil-like substance with the blowing agent powder under such mixing conditions that the blowing agent powder is less susceptible to pulverization.

DETAILED DESCRIPTION OF THE INVENTION

The present inventors made intensive studies in order to resolve the above problems. As a result, the inventors have found that a blowing agent powder having the desired properties is obtained by adding an oil-like substance in the form of a mist to a blowing agent powder and mixing the oil-like substance with the blowing agent powder under such mixing conditions that the blowing agent powder is less susceptible to pulverization. As a result, dusting in the working atmosphere is inhibited during each of packaging, transportation, storage, use, and the like, and a blowing agent powder which is homogeneous and has satisfactory dispersibility into resins is provided.

Furthermore, the present inventors assumed that the solidification of a blowing agent powder proceeds because a slight amount of water, specifically the water contained in a slight amount in the blowing agent particles and the water absorbed by the blowing agent particles from the atmosphere during production, transportation, and storage, serves to bond the blowing agent particles to one another on their surfaces. Further investigations were made based on this assumption. As a result, the present inventors have found that a blowing agent powder significantly inhibited from solidification and satisfactory in flowability, dispersibility into resins, and the like, even after the lapse of a prolonged period of time is obtained by reacting the water contained in blowing agent particles with a surface-treating agent capable of removing water from the blowing agent, such as a coupling agent, and preferably form a film of the surface-treating agent on the surface of the blowing agent particles. As a result, solidification of the blowing agent powder is markedly inhibited, and a blowing agent powder which is homogeneous and has satisfactory dispersibility into resins is provided.

The blowing agent powder which can be used in the present invention is selected from conventionally known blowing agents. Examples include blowing agents, for example, azodicarbonamide (ADCA), hydrazodicarbonamide (HDCA), p,p'-oxybis(benzenesulfonyl hydrazide) (OBSH), dinitropentamethylenetetramine (DPT), p-toluenesulfonyl hydrazide (TSH), benzenesulfonyl hydrazide (BSH), 5-phenyltetrazole (5-PT), and the like, and salts of these with an alkaline earth metal (e.g., calcium, barium, or strontium) or with aluminum, and the like; and inorganic blowing agents, for example, sodium hydrogen carbonate, anhydrous monosodium citrate, and the like. Among these, preferred are ADCA, OBSH, DPT, TSH, BSH, 5-PT, and the like; and salts of these with calcium, barium, strontium, aluminum, and the like. Especially preferred is ADCA.

In the present, invention, these blowing agent powders are used alone or as a mixture of two or more thereof.

Although the particle diameter of the blowing agent powder is not particularly limited in the present invention, the process of the present invention is generally applicable to blowing agent powders having a particle diameter of about 1 to 100 μm, which often pose the problem of dusting. The particle diameter of the blowing agent powder is preferably about 2 to 50 μm, more preferably about 3 to 30 μm, and most preferably about 3 to 20 μm. The term "particle diameter" as used herein for a blowing agent powder means the median size thereof determined with a laser diffraction type particle size distribution analyzer.

The blowing agent powder for use in the present invention may contain one or more other ingredients known in this field, such as a stabilizer, a pigment/filler, a blowing inhibitor, and the like. A blowing agent powder containing these ingredients is included in the blowing agent powder of the present invention.

Examples of the stabilizer include tribasic lead sulfate, dibasic phosphites, lead stearate, zinc stearate, zinc carbonate, zinc oxide, barium stearate, aluminum stearate, calcium stearate, dibutyltin maleate, urea, and the like. Examples of the pigment/filler include chrome yellow, carbon black, titanium dioxide, calcium carbonate, and the like. Examples of the blowing inhibitor include maleic acid and the like.

The term "substantially anhydrous" as used herein means to have a water content lower than 0.03% by weight, preferably lower than 0.01% by weight. The water content, (% by weight) in a blowing agent (e.g., crystalline ADCA) is herein determined by heating the blowing agent at 110° C. for 2 hours while passing water-free nitrogen gas therethrough, introducing the effluent nitrogen gas into a Karl Fisher's water meter (trade name: MKS-1; manufactured by Kyoto Electronics Manufacturing Co., Ltd.) prevented from suffering water penetration thereinto from the surrounding air to measure the amount of water contained in the nitrogen gas, and converting this water amount into a percentage amount based on the weight of the blowing agent.

Such a substantially anhydrous blowing agent powder can be obtained by a step (c) of adding to a blowing agent a surface-treating agent capable of removing water from the blowing agent. The step (c) may be included in the steps relating to the process for producing the blowing agent according to the present invention.

In the process for producing the blowing agent of the present invention including the step (c), the step may be carried out prior to, during or after the step (a). That is, in the process of the present invention, the order of adding the surface-treating agent and the oil-like substance is not particularly limited; however, any of the following methods may be employed: (1) a method in which the surface-treating agent is added first, and an oil-like substance is then added; (2) a method in which the surface-treating agent and an oil-like substance are added simultaneously; and (3) a method in which an oil-like substance is added first and the surface-treating agent is then added. Among these, method (1) or (2) is preferred in the present invention. More preferably, the surface-treating agent is added to the blowing agent powder in the form of a mist. According to the addition of the surface-treating agent, the desired blowing agent powder which is inhibited from causing dusting and is inhibited from aggregation and solidification with the lapse of time or under load can be provided.

The surface-treating agent which can be used in the present invention is one capable of removing water from a blowing agent. Examples include compounds having the property of chemically reacting with water and compounds having the property of adsorbing or holding water. Specific examples include coupling agents, organic acid anhydrides, anhydrous inorganic compounds, desiccants, and the like.

Examples of the coupling agents include silane coupling agents, aluminum coupling agents, titanate coupling agents, and the like.

Examples of the silane coupling agents include conventionally known silane coupling agents. Specific examples include methyltrimethoxysilane, γ-aminopropyltriethoxysilane, N-(β-aminoethyl)-γ-aminopropyltrimethoxysilane, N-phenylaminomethyltrimethoxysilane, vinylmethyldiethoxysilane, and the like.

Examples of the aluminum coupling agents include conventionally known aluminum coupling agent Specific examples include aluminum isopropylate, aluminum ethylate, aluminum tris(ethylacetoacetate), ethylacetoacetatoaluminum diisopropylate, and the like.

Examples of the titanate coupling agents include conventionally known titanate coupling agents. Specific examples include isopropyl triisostearoyl titanate, isopropyl tris(dioctyl pyrophosphate) titanate, tetraoctyl bis(ditridecyl phosphite) titanate, bis(dioctyl pyrophosphate) hydroxyacetate titanate, and the like.

These coupling agents can be used alone or as a mixture of two or more thereof. Among these, preferred are aluminum coupling agents, particularly, aluminum tris (ethylacetoacetate).

It is considered that the aluminum coupling agent reacts with water contained in a blowing agent powder by mixing with the blowing agent powder to form a film of aluminum hydroxide on the surface of the blowing agent particles. A substantially anhydrous blowing agent can be produced according to such effect that the aluminum coupling agent remove the water present on the surface and in the pores of the blowing agent powder. Furthermore, even if a quite small amount of water is remained in the inner parts of the blowing agent powder, the film composed of aluminum hydroxide keeps the surface of the powder substantially anhydrous by shielding the transfer of the water to the powder surface to thereby contribute to aggregation and solidification prevention.

Additionally, the aluminum coupling agent remaining unreacted is considered to inhibit hygroscopicity from the external to thereby contribute to prevention of aggregation and solidification due to its water repellency.

Examples of the organic acid anhydrides include conventionally known organic acid anhydrides. Specific examples include phthalic anhydride, succinic anhydride, glutaric anhydride, benzoic anhydride, trimellitic anhydride, and the like. These compounds react with and remove water in a blowing agent, for example, by the following mechanism:

(wherein R represents an organic acid residue).

The above coupling agents and the organic acid anhydrides can be especially preferred because they not only have the property of chemically bonding to water to thereby remove the water contained in a blowing agent, but also have the property of forming a film capable of preventing external water absorption on the surface of the blowing agent (for example, unreacted coupling agent, and the like).

Examples of the anhydrous inorganic compounds include known anhydrous inorganic compounds so long as they can remove crystal water by binding to water. Specific examples include anhydrous magnesium sulfate, anhydrous potassium carbonate, anhydrous sodium carbonate, anhydrous sodium sulfate, anhydrous sodium sulfite, anhydrous magnesium carbonate, and the like. These compounds react with water contained in a blowing agent and fix the reacted water as crystal water, for example, by the following typical mechanism:

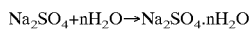

$$Na_2SO_4 + nH_2O \rightarrow Na_2SO_4 \cdot nH_2O$$

(wherein n represents an integer of 1 or more).

Examples of desiccants include conventionally known desiccants so long as they have the property of removing water. Specific examples include acid clay, silica gel, magnesium oxide, calcium oxide, and the like.

In the present invention, the coupling agents, the organic acid anhydrides, the anhydrous inorganic compounds, and the desiccants may be used alone or as a mixture of two or more thereof as the surface-treating agent.

The addition amount of the surface-treating agent based on the blowing agent powder is preferably selected so that the surface-treating agent amount is sufficient to permit the water contained in the blowing agent powder to react completely. Specifically, the surface-treating agent can be used in an amount of about 0.01 to 10 parts by weight, preferably about 0.05 to 0.5 parts by weight, based on 100 parts by weight of the blowing agent powder.

Upon application to the surface of a blowing agent and preferably heating, the surface-treating agent efficiently reacts with water contained in the blowing agent to thereby reduce the water content of the blowing agent.

The surface-treating agent is preferably used as it is without being dissolved in a solvent, preferably under conditions substantially free of a solvent, in order that no adverse influence be exerted on reaction with water or adsorption of water. If a solution or dispersion of an coupling agent in a solvent is used, the reaction between the water present in the blowing agent and the coupling agent does not proceed sufficiently, water is remained in the blowing agent, and therefore, a substantially anhydrous blowing agent cannot be obtained. Consequently, such use is not preferred. Especially, use of an organic solvent containing water or moisture is not preferred because a water content in the blowing agent may be increased to the contrary.

The term "under conditions substantially free of water" as used herein means that no solvent is used or that an organic solvent containing a water content of less than 0.1% by weight is used in an amount equal to or less than the amount of the surface-treating agent. In the case of using a solid surface-treating agent, it is preferably used in the form of a fine powder or after being melted.

In the case of using a surface-treating agent which is solid at ordinary temperature, the surface-treating agent is preferably subjected to preheating treatment prior to the addition thereof to a blowing agent. For example, preferably, the solid aluminum coupling agent is subjected to heating treatment at 70 to 90° C. so that the heated and melted aluminum coupling agent is used.

The term "oil-like substance" as used herein means any of oils and fats in a liquid to solid state, hydrocarbons, and fatty acids.

Examples of the oils and fats include natural fats derived from vegetables or animals, such as soybean oil, coconut oil, linseed oil, cotton seed oil, rapeseed oil, tung oil, pine oil, rosin, castor oil, beef tallow, squalene, lanolin, and hardened oils, and purified products of these.

Examples of the hydrocarbons include aliphatic hydrocarbons having 20 to 48 carbon atoms, inclusively called paraffin waxes, and derivatives thereof; aliphatic hydrocarbons having 8 to 19 carbon atoms and derivatives thereof (for example, dialkyl phthalates (e.g., dioctyl phthalate, and the like), phthalates of higher alcohols (e.g., nonyl phthalate, and the like), and the like); paraffinic, naphthenic, or aromatic processing oils; liquid paraffins; and the like. The above hydrocarbons include those isolated and purified from the above natural oils and fats.

Examples of the fatty acids include fatty acids (for example, lauric acid, myristic acid, palmitic acid, stearic acid, oleic acid, behenic acid, and the like), salts thereof, and other derivatives thereof. The fatty acids include those isolated and purified from the above natural oils and fats.

Oil-like substances having a melting point of 90° C. or lower are preferably used in the present invention. More preferred are oil-like substances which are liquid at ordinary temperature. An especially preferred oil-like substance is a liquid paraffin.

In the present invention, the oil-like substance can be used as it is or after being dissolved in an appropriate solvent. Examples of the solvent include aromatic hydrocarbons, such as toluene, xylene and the like. In the case where an oil-like substance which is solid at ordinary temperature is used, it is preferred to liquefy the same by heating.

In the step (a) in the present invention, the addition of an oil-like substance to a blowing agent powder is accomplished by forming a mist of the oil-like substance and spraying the same over the blowing agent powder. If an oil-like substance placed in a container, e.g., a cup, is directly added to a blowing agent powder, for example, by dropping, the blowing agent powder cannot be sufficiently mixed with the oil-like substance. As a result, blowing agent powders which, even in the same lot, have unevenness of the content of the oil-like substance are given. The thus obtained blowing agent powders are hence unsuitable for use in applications where even and fine foaming is required.

Examples of methods for forming a mist of an oil-like substance and spraying the mist over a blowing agent powder include a method in which a liquid oil-like substance or an oil-like substance which has been liquefied by heating is sprayed over a blowing agent powder by means of an atomizer. Examples of the atomizer include a two-fluid nozzle and a pressure nozzle. The size of the mist particles during spraying is generally about 0.1 to 100 μm, preferably about 1 to 50 μm, and more preferably about 1 to 10 μm.

The addition amount of the oil-like substance based on the blowing agent powder is preferably 0.001 to 10 parts by weight, more preferably 0.1 to 0.5 parts by weight, based on 100 parts by weight of the blowing agent powder. By regulating the addition amount of the oil-like substance to 0.001 part by weight or more, a blowing agent powder sufficiently inhibited from causing dusting can be obtained. By regulating the addition amount of the oil-like substance to 10 parts by weight or less, preferably 0.5 part by weight or less, the blowing agent powder can be inhibited from solidification or having impaired dispersibility into resins. More specifically, it is preferred to regulate the addition amount of the oil-like substance according to the specific surface area of the blowing agent powder. For example, the addition amount of an oil-like substance for a blowing agent powder having a small specific surface area (0.1 to 2 m$^2$/g) is preferably small (0.001 to 0.5 part by weight), while that for a blowing agent powder having a large specific surface area (2 to 10 m$^2$/g) is preferably large (0.2 to 10 parts by weight).

In the step (b) in the present invention, the mixing is conducted under mixing conditions that the blowing agent powder is less susceptible to pulverization. Herein the term "under mixing conditions that the blowing agent powder is less susceptible to pulverization" means that an increase in the specific surface area through the mixing is 20% or less, more preferably 10% or less. Mixing apparatuses which can be used for the above mixing are not particularly limited. Examples include supermixers, Henschel mixers, screw mixers such as Nauta mixers, proshear mixers, and ribbon blenders.

If a blowing agent is pulverized in the above mixing, dust reducing effect may be lost, and the resultant powder has an increased specific surface area and hence enhanced hygroscopicity. Additionally, even if the blowing agent powder which has been coated to inhibit water adsorption is used, a section having no coating is provided, and hence hygroscopicity is enhanced more and more. Thus, the effect of the present invention may be lost. Particularly, if the blowing agent powders having a particle diameter of 10 μm or more which are easily pulverized are used, it should be especially paid attention to this point.

For more evenly mixing a blowing agent powder with an oil-like substance in the present invention, the mixing apparatus used is preferably operated at a sufficiently high mixing speed as long as the blowing agent powder is inhibited from being pulverized. Namely, it is preferred to conduct the mixing under such conditions that the blowing agent powder is not pulverized, in such a manner that the blowing agent powder is evenly sprayed with the oil-like substance, in other words, the blowing agent powder is sprayed with these ingredients over a certain period so as to avoid unevenness of spraying.

In the step (b) in the present invention, the blowing agent powder is mixed with the oil-like substance and the like under heating.

For example, the heating temperature is generally from 30° C. to the decomposition temperature of the blowing agent, preferably from 40° C. to the decomposition temperature of the blowing agent. If ADCA, OBSH, DPT or the like having a decomposition temperature of not lower than 150° C. is used as a blowing agent, the preferred temperature is 55 to 100° C. From the standpoint of reducing the heating period to conduct the mixing even more efficiently to thereby minimize the energy cost, it is preferred to use a heating temperature of about 70 to 90° C.

The addition method, mixing conditions, and heating temperature in the above method of treating the blowing agent powder with the oil-like substance can be selected in the same manner as in the method of treating the blowing agent powder with the surface-treating agent in step (c).

Although the step (b) may be conducted after the step (a) in the process of the present invention, it is especially preferred to simultaneously conduct the steps (a) and (b). Furthermore, it is preferred that the step (c) is simultaneously conducted.

More specifically, in the case where a cone ribbon blending dryer having a capacity of 50 liters (trade name: Ribocone E RME-50; manufactured by Okawara Mfg. Co., Ltd.), for example, is used as the mixing apparatus, it is preferably operated at a rotational speed of 40 to 100 rpm, a spraying rate for the aluminum compound coupling agent of 1 to 200 g/min (preferably 1 to 20 g/min), a spraying rate for the oil-like substance of 1 to 200 g/min (preferably 1 to 20 g/min), and a mixing period of 1 to 30 minutes. In the case where a cone ribbon blending dryer having a capacity of 400 liters (trade name: Ribocone E RME-400; manufactured by Okawara Mfg. Co., Ltd.), for example, is used as the mixing apparatus, it is preferably operated under the conditions of a rotational speed of 30 to 70 rpm, a spraying rate for the aluminum compound coupling agent of 10 to 2,000 g/min (preferably 10 to 100 g/min), a spraying rate for the oil-like substance of 10 to 2,000 g/min (preferably 10 to 100 g/min), and a mixing period of 1 to 30 minutes.

Since the blowing agent powder modified by the process of the present invention is inhibited from causing dusting in the handling atmosphere in each of packaging, storage, transportation, use, and the like, it does not adversely influence the health of the workmen. The blowing agent powder of the present invention is equal or superior to conventional blowing agent powders in foaming performance. Furthermore, since the blowing agent powder of the present invention has satisfactory dispersibility into resins, it is especially suitable for use in applications where even and fine foaming is required, for example, in the production of foamed sheets for use as wall papers. Additionally, since the blowing agent powder of the present invention has intact unsusceptibility to solidification, it does not necessitate a step of pulverization or the like before use.

The blowing agent powder of the present invention has been significantly improved especially in unsusceptibility to solidification under load and in unsusceptibility to solidification with the lapse of time. Hence, it is not only hardly solidified even through long-term storage in a stacked state, but also retains over long the satisfactory flowability and the satisfactory dispersibility into resins which properties are possessed immediately after production.

Consequently, as a result that the blowing agent powder of the present invention is provided, the fear that blowing agent powder products may be solidified under load or with the lapse of time from the production thereof to the use thereof by users is eliminated.

The present invention will be explained below in more detail by reference to Examples, Comparative Examples, and Test Examples.

The oil-like substances used in the following Examples and Comparative Examples are as follows: Oil-like substance A: highly purified liquid paraffin having 21 carbon atoms on the average (trade name: U-6; manufactured by Matsumura Oil Research Corp.); Oil-like substance B: liquid paraffin having 21 carbon atoms on the average (trade name, P-60: manufactured by Matsumura Oil Research Corp.); Oil-like substance C: liquid paraffin having 33 carbon atoms on the average (trade name: P-350P; manufactured by Matsumura Oil Research Corp.)

EXAMPLES 1 TO 8

Into a cone ribbon blender having a capacity of 50 liters (trade name: Ribocone E; manufactured by Okawara Mfg. Co., Ltd.) was introduced 20 kg of ADCA (manufactured by Otsuka Chemical Co., Ltd.; average particle diameter: 5 μm; specific surface area: 1.5 m$^2$/g; the same applies in the following Examples 9 to 11 and Comparative Example 1). Oil-like substance A, B, or C was sprayed over the ADCA with a two-fluid nozzle or a pressure nozzle under the conditions shown in Table 1 given later, while mixing the contents at a rotational speed of 76 rpm. In Table 1, "flow rate" means "flow rate for spraying". After completion of the spraying, the contents were further stirred continuously for 7 minutes and 30 seconds to obtain a blowing agent powder according to the present invention.

EXAMPLE 9

ADCA was introduced into a supermixer (capacity: 200 liters; manufactured by Kawata Seisakusho K.K.). Oil-like substance A was sprayed over the ADCA with a two-fluid nozzle while mixing the contents at a rotational speed of 300 rpm. Thereafter, the contents were further stirred continuously for 7 minutes and 30 seconds to obtain a blowing agent powder.

EXAMPLE 10

A blowing agent powder was obtained in the same manner as in Example 9, except that the addition of oil-like substance A was conducted by dropping.

EXAMPLE 11

A blowing agent powder was obtained in the same manner as in Example 1, except that the addition of oil-like substance A was conducted by dropping.

Comparative Example 1

ADCA in the untreated state was taken as a blowing agent powder of Comparative Example 1.

Test Example 1

A 5 g portion was taken from the blowing agent powder obtained in each of the above Examples and Comparative Examples, and examined with a Heubach dust meter for the degree of dusting (%) under the conditions of a flow rate of 20 1/min and an examination period of 5 minutes. The results obtained are shown in Table 1.

TABLE 1

| | Oil-like substance | Addition amount | Nozzle | Flow rate (g/min) | Mixer | Degree of dusting (%) |
|---|---|---|---|---|---|---|
| Ex. 1 | A | 50 g (0.25%) | two-fluid | 5.0 | Ribocone E | 0.1 |
| Ex. 2 | B | 50 g (0.25%) | two-fluid | 3.7 | Ribocone E | 0.1 |
| Ex. 3 | C | 50 g (0.25%) | two-fluid | 2.7 | Ribocone E | 0.1 |
| Ex. 4 | A | 50 g (0.25%) | two-fluid | 51.0 | Ribocone E | 0.1 |
| Ex. 5 | A | 50 g (0.25%) | two-fluid | 35.0 | Ribocone E | 0.1 |
| Ex. 6 | A | 50 g (0.25%) | pressure | 5.0 | Ribocone E | 0.1 |
| Ex. 7 | A | 100 g (0.5%) | two-fluid | 5.0 | Ribocone E | 0.1 |
| Ex. 8 | A | 20 g (0.1%) | two-fluid | 5.0 | Ribocone E | 0.3 |
| Ex. 9 | A | 50 g (0.25%) | two-fluid | 5.0 | supermixer | 0.1 |
| Ex. 10 | A | 50 g (0.25%) | dropping | — | supermixer | 0.1 |
| Ex. 11 | A | 50 g (0.25%) | dropping | — | Ribocone E | 0.1 |
| Comp. Ex. 1 | — | — | — | — | — | 12.3 |

The results given in Table 1 show that the blowing agent powders according to the present invention were significantly inhibited from causing dusting as compared with the untreated blowing agent powder (Comparative Example 1).

Test Example 2

A 400 g portion of each of the blowing agent powders obtained in the above Example 1 and Comparative Example 1 was packed into a polyethylene bag having dimensions of 23 cm by 13 cm. After sufficient deaeration, the opening of each bag was heat-sealed. The packages thus obtained were stacked, and a load of 0.08 kg/cm$^2$ was imposed on the stack. These packages were allowed to stand for 10 days in that state to obtain blowing agent powders to be tested.

To 100 parts by weight of poly(vinyl chloride) were added 3 parts by weight of each blowing agent powder to be tested, 2.5 parts by weight of a calcium/zinc compound stabilizer (trade name: KV-83; manufactured by Kyodo Chemical Co., Ltd.), and 60 parts by weight of a plasticizer (dioctyl phthalate). These ingredients were mixed by means of a propeller mixer at 400 rpm for 3 or 7 minutes. The resultant mixture was applied to a flame-retardant paper for wall paper use in a thickness of 0.25 mm over an area having a width of 120 mm and a length of 400 mm, and the coating was caused to gel by heating at 145° C. for 45 seconds to obtain a sheet. The sheet obtained was visually examined to count the number of blowing agent solidification contained therein to thereby evaluate dispersibility.

Both samples had the same dispersibility. The results show that the blowing agent powder of the present invention was equal in foaming performance to the untreated blowing agent powder.

EXAMPLE 12

In a cone ribbon blender (trade name: Ribocone E RME-400; manufactured by Okawara Mfg. Co., Ltd.) was placed 250 kg of ADCA (manufactured by Otsuka Chemical Co., Ltd.; average particle diameter, 20 μm; the same applies in the following Examples 13 to 18 and Comparative Example 2–4). Thereto were simultaneously added, with stirring at 70 rpm and 90° C., 250 g of aluminum tris(ethylacetoacetate) (trade name: ALCH-TR; manufactured by Kawaken Fine Chemicals Co., Ltd.) which had been melted by heating at 90° C. and 125 g of oil-based substance B which had not been preheated, by spraying in the form of a mist using a two-fluid nozzle (the thermally molten aluminum tris (ethylacetoacetate) was sprayed at a rate of 20 g/min, and the liquid paraffin was sprayed at a rate of 10 g/min). After completion of the addition, stirring was further continued under the same conditions for 7.5 minutes to obtain a blowing agent powder according to the present invention.

EXAMPLE 13

In a cone ribbon blender (trade name: Ribocone E RME-400; manufactured by Okawara Mfg. Co., Ltd.) was placed 250 kg of ADCA. Thereto was added, with stirring at 70 rpm and 90° C., 250 g of aluminum tris (ethylacetoacetate) (trade name: ALCH-TR; manufactured by Kawaken Fine Chemicals Co., Ltd.) which had been melted by heating at 90° C., by spraying in the form of a mist using a two-fluid nozzle (the thermally molten aluminum tris(ethylacetoacetate) was sprayed at a rate of 20 g/min). After completion of the addition, stirring was further continued under the same conditions for 10 minutes. Subsequently, while the contents were continuously stirred, 125 g of oil-based substance B which had not been preheated was added thereto by spraying in the form of a mist using a two-fluid nozzle (the liquid paraffin was sprayed at a rate of 10 g/min). After completion of the addition, stirring was further continued for 7.5 minutes to obtain a blowing agent powder according to the present invention.

EXAMPLE 14

In a cone ribbon blender (trade name: Ribocone E RME-400; manufactured by Okawara Mfg. Co., Ltd.) was placed 250 kg of ADCA. Thereto were simultaneously added, with stirring at 70 rpm and 90° C., 250 g of aluminum tris (ethylacetoacetate) (trade name: ALCH-TR; manufactured by Kawaken Fine Chemicals Co., Ltd.) which had been melted by heating at 90° C. and 125 g of oil-based substance B which had not been preheated, by dropping (the thermally molten aluminum tris(ethylacetoacetate) was dropped at a rate of 20 g/min, and the liquid paraffin was dropped at a rate of 10 g/min). After completion of the addition, stirring was further continued under the same conditions for 7.5 minutes to obtain a blowing agent powder according to the present invention.

EXAMPLE 15

A mixture of 250 g of aluminum tris(ethylacetoacetate) (trade name: ALCH-TR; manufactured by Kawaken Fine Chemicals Co., Ltd.) and 500 g of oil-based substance B was prepared and melted by heating at 90° C. beforehand. Subsequently, 250 kg of ADCA was placed in a cone ribbon blender (trade name: Ribocone E RME-400; manufactured by Okawara Mfg. Co., Ltd.). Thereto was added, with stirring at 70 rpm and 90° C., the aluminum tris (ethylacetoacetate)/liquid paraffin mixture prepared beforehand, by spraying in the form of a mist using a two-fluid nozzle (the aluminum tris(ethylacetoacetate)/liquid paraffin mixture was sprayed at a rate of 20 g/min). After completion of the addition, stirring was further continued under the same conditions for 7.5 minutes to obtain a blowing agent powder according to the present invention.

EXAMPLE 16

In a cone ribbon blender (trade name: Ribocone E RME-400; manufactured by Okawara Mfg. Co., Ltd.) was placed 250 kg of ADCA. Thereto was added, with stirring at 70 rpm and 90° C., 250 g of aluminum tris(ethylacetoacetate) (trade name: ALCH-TR; manufactured by Kawaken Fine Chemicals Co., Ltd.) which had been melted by heating at 90° C., by spraying in the form of a mist using a pressure nozzle (the thermally molten aluminum tris(ethylacetoacetate) was sprayed at a rate of 40 g/min). After completion of the addition, stirring was further continued under the same conditions for 10 minutes. Subsequently, while the contents were continuously stirred, 125 g of oil-based substance B which had not been preheated was added thereto by spraying in the form of a mist using a pressure nozzle (the liquid paraffin was sprayed at a rate of 20 g/min). After completion of the addition, stirring was further continued for 7.5 minutes to obtain a blowing agent powder according to the present invention.

EXAMPLE 17

In a cone ribbon blender (trade name: Ribocone E RME-400; manufactured by Okawara Mfg. Co., Ltd.) was placed 250 kg of ADCA. Thereto was added, with stirring at 70 rpm and 90° C., 500 g of aluminum tris (ethylacetoacetate) (trade name: ALCH-TR; manufactured by Kawaken Fine Chemicals Co., Ltd.) which had been melted by heating at 90° C., by spraying in the form of a mist using a two-fluid nozzle (the thermally molten aluminum tris(ethylacetoacetate) was sprayed at a rate of 20 g/min). After completion of the addition, stirring was further continued under the same conditions for 10 minutes. Subsequently, while the contents were continuously stirred, 125 g of oil-based substance B which had not been preheated was added thereto by spraying in the form of a mist using a two-fluid nozzle (the liquid paraffin was sprayed at a rate of 5 g/min). After completion of the addition, stirring was further continued for 7.5 minutes to obtain a blowing agent powder according to the present invention.

EXAMPLE 18

In a supermixer (trade name: SMV-200; manufactured by Kawata Seisakusho K.K.) was placed 100 kg of ADCA. Thereto were simultaneously added, with stirring at 300 rpm and 90° C., 100 g of aluminum tris(ethylacetoacetate) (trade name: ALCH-TR; manufactured by Kawaken Fine Chemicals Co., Ltd.) which had been melted by heating at 90° C. and 50 g of oil-based substance B which had not been preheated, by spraying in the form of a mist using a two-fluid nozzle (the thermally molten aluminum tris (ethylacetoacetate) was sprayed at a rate of 20 g/min, and the liquid paraffin was sprayed at a rate of 10 g/min). After completion of the addition, stirring was further continued under the same conditions for 7.5 minutes to obtain a blowing agent powder.

Comparative Example 2

The untreated blowing agent was taken as a blowing agent powder of Comparative Example 2.

Comparative Example 3

In a cone ribbon blender (trade name: Ribocone E RME-400; manufactured by Okawara Mfg. Co., Ltd.) was placed 250 kg of ADCA. Thereto was added, with stirring at 70 rpm and 90° C., 250 g of aluminum tris(ethylacetoacetate) (trade name: ALCH-TR; manufactured by Kawaken Fine Chemicals Co., Ltd.) which had been melted by heating at 90° C. as the only additive, by spraying in the form of a mist using a two-fluid nozzle (the thermally molten aluminum tris (ethylacetoacetate) was sprayed at a rate of 20 g/min). After completion of the addition, stirring was further continued under the same conditions for 7.5 minutes to obtain a blowing agent powder.

Comparative Example 4

In a cone ribbon blender (trade name: Ribocone E RME-400; manufactured by Okawara Mfg. Co., Ltd.) was placed 250 kg of ADCA. Thereto was added, with stirring at 70 rpm and 90° C., 125 g of oil-based substance B which had not been preheated as the only additive, by spraying in the form of a mist using a two-fluid nozzle (the liquid paraffin was sprayed at a rate of 20 g/min). After completion of the addition, stirring was further continued under the same conditions for 7.5 minutes to obtain a blowing agent powder.

Test Example 3
Evaluation of Solidification Property

Each of the blowing agent powders obtained in Examples 9 to 14 and Comparative Examples 2 to 4 given above was subjected to a solidification test in stacking and a solidification test in practical package by the following methods. The results obtained are shown in Table 2.

(1) Solidification Test in Stacking

Polyethylene bags each having dimensions of 23 cm by 13 cm were respectively packed with 450 g portions of a sample. After sufficient deaeration, the opening of each bag was heat-sealed. The packages thus obtained were stacked, and a load of 0.216 kg/cm² was imposed on the stack. After 14 days, the sample was taken out and screened with a 14-mesh sieve to measure the amount of the sample screened out. This amount was converted to %, which was taken as the value of solidification in stacking.

(2) Solidification Test in Practical Package

A 25 kg portion of a sample was packed into a corrugated fiberboard case for use as a product packaging container for distribution. This package was allowed to stand for 1 month under the conditions of a temperature of 40° C. and a humidity of 80%. Thereafter, the sample was screened with a 14-mesh sieve to measure the amount of the sample screened out. This amount was converted to %, which was taken as the value of solidification in practical package.

Test Example 4
Evaluation of Foaming Performance

Each of the blowing agent powders obtained in Example 1 and Comparative Example 2 was compounded in an amount of 15 parts by weight with 100 parts by weight of low-density polyethylene (melt index, 2.0) and 0.8 parts by weight of dicumyl peroxide. The resultant compositions each was kneaded under heating at a roll temperature of 110 to 115° C., taken out as a sheet having a thickness of 5 mm, and then heated at 125° C. for 5 minutes while applying a pressure of 120 kg/cm² thereto to obtain a pressed sheet. The sheets obtained were foamed using a hot-air oven set at 220° C. The foamed objects thus obtained using the blowing agent powder of Example 12 and that of Comparative Example 2, respectively, each had uniform and fine cells. The two foamed objects were satisfactory and almost equal to each other in surface smoothness and decomposition rate.

These results show that the blowing agent powder of the present invention was equal in foaming performance to the untreated blowing agent powder.

Test Example 5
Measurement of Degree of Dusting

A 5 g portion was taken from each of the blowing agent powders obtained in Examples 9 to 14 and Comparative Examples 5 to 8 given above, and examined with a Heubach dust meter for the degree of dusting (%) under the conditions of a flow rate of 20 l/min and an examination period of 5 minutes. The results obtained are also shown in Table 2.

TABLE 2

| | Ex. 12 | Ex. 13 | Ex. 14 | Ex. 15 | Ex. 16 | Ex. 17 | Ex. 18 | Comp. Ex. 2 | Comp. Ex. 3 | Comp. Ex. 4 |
|---|---|---|---|---|---|---|---|---|---|---|
| Aluminum compound coupling agent | | | | | | | | | | |
| Amount (pts. wt.) | 0.1 | 0.1 | 0.1 | 0.1 | 0.1 | 0.2 | 0.1 | — | 0.1 | — |
| Rate of addition (g/min) | 20 | 20 | 20 | 20* | 40 | 20 | 20 | — | 20 | — |
| Method of addition | two-fluid nozzle | two-fluid nozzle | dropping | two-fluid nozzle | pressure nozzle | two-fluid nozzle | two-fluid nozzle | — | two-fluid nozzle | — |
| Liquid paraffin | | | | | | | | | | |
| Amount (pts. wt.) | 0.05 | 0.05 | 0.05 | 0.2 | 0.05 | 0.05 | 0.05 | — | — | 0.05 |
| Rate of addition (g/min) | 10 | 10 | 10 | 20* | 20 | 5 | 10 | — | — | 20 |
| Method of addition | two-fluid nozzle | two-fluid nozzle | dropping | two-fluid nozzle | pressure nozzle | two-fluid nozzle | two-fluid nozzle | — | — | two-fluid nozzle |
| Means of addition | simultaneous spraying | separate spraying | simultaneous spraying | mixture spraying | separate spraying | separate spraying | simultaneous spraying | — | — | — |
| Mixing apparatus | Ribocone | Ribocone | Ribocone | Ribocone | Ribocone | Ribocone | super-mixer | Ribocone | Ribocone | Ribocone |
| Value of solidification in stacking (%) | 5 | 5 | 15 | 25 | 10 | 3.1 | 25 | 55 | 3 | 59 |
| Value of solidification in practical package (%) | 2.1 | 2.3 | 9.2 | 15 | 5 | 1.9 | 19 | 40 | 1.8 | 45 |
| Degree of dusting (%) | 0.1 | 0.1 | 3.4 | 0 | 0.1 | 0.1 | 2.2 | 12.0 | 4.8 | 2.0 |

*In the column of Example 15, 20* is the rate of addition of the aluminum compound coupling agent/liquid paraffin mixture.

While the invention has been described in detail and with reference to specific embodiments thereof, it will be apparent to one skilled in the art that various changes and modifications can be made therein without departing from the spirit and scope thereof.

What is claimed is:

1. A powder consisting essentially of a blowing agent powder having a particle diameter between 1 and 100 μm which is coated with at least one substance selected from the group consisting of oils and fats in liquid and solid state, hydrocarbons, and fatty acids, wherein said blowing agent powder is substantially anhydrous having a water content of lower than 0.03% by weight.

2. The powder according to claim 1, wherein the substance is used in an amount of 0.0001 to 10 parts by weight based on 100 parts by weight of the blowing agent powder.

3. The powder according to claim 1, wherein the substance is used in an amount of 0.1 to 0.5 parts by weight based on 100 parts by weight of the blowing agent powder.

4. The powder according to claim 1, wherein the substance is a liquid paraffin.

5. The powder according to claim 1, wherein the blowing agent powder is azodicarbonamide.

6. The powder according to claim 1, wherein the blowing agent powder is obtained by treating a blowing agent with a surface-treating agent capable of removing water from the blowing agent.

7. The powder according to claim 6, wherein the surface-treating agent is at least one selected from the group consisting of a coupling agent, an organic acid anhydride, an anhydrous inorganic compound, and a desiccant.

8. The powder according to claim 6, wherein the surface-treating agent is at least one selected from the group consisting of a silane coupling agent, an aluminum coupling agent, and a titanate coupling agent.

9. The powder according to claim 1, wherein the substantially anhydrous blowing agent powder has a water content of lower than 0.01% by weight.

10. A process for producing a powder comprising a blowing agent powder core having a particle diameter between 1 and 100 μm which is coated with at least one substance selected from the group consisting of oils and fats in liquid and solid state hydrocarbons and fatty acids, comprising the following steps (a) and (b):
   (a) adding the substance in the form of a mist to a blowing agent powder; and
   (b) mixing the substance with the blowing agent powder under such mixing conditions that the blowing agent powder is less susceptible to pulverization and that an increase in the specific surface area through the mixing is 20% or less.

11. The process according to claim 10, wherein the substance with the blowing agent powder is mixed under such mixing conditions that an increase in the specific surface area though the mixing is 10% or less.

12. The process according to claim 10, wherein the substance is used in an amount of 0.001 to 10 parts by weight based on 100 part by weight of the blowing agent powder.

13. The process according to claim 10, wherein the substance is used in an amount of 0.1 to 0.5 parts by weight based on 100 parts by weight of the blowing agent powder.

14. The process according to claim 10, wherein the substance is a liquid paraffin.

15. The process according to claim 10, wherein the blowing agent powder is azodicarbonamide.

16. The process according to claim 10, which further comprises the following step (c):
   (c) adding to the blowing agent powder a surface-treating agent capable of removing water from the blowing agent.

17. The process according to claim 16, wherein the surface-treating agent is added in the form of a mist.

18. The process according to claim 17, wherein the step (c) is carried out prior to or during the step (a).

19. The process according to claim 16, wherein the surface-treating agent is at least one selected from the group consisting of a coupling agent, an organic acid anhydride, an anhydrous inorganic compound, and a desiccant.

20. The powder according to claim 16, wherein the surface-treating agent is at least one selected from the group consisting of a silane coupling agent, an aluminum coupling agent, and a titanate coupling agent.

* * * * *